May 29, 1956

E. H. HULTS 2,748,382

SELECTIVELY RESPONSIVE INDICATOR

Filed Nov. 22, 1952

INVENTOR.
ELLSWORTH H. HULTS
BY Victor D. Borst
ATTORNEY

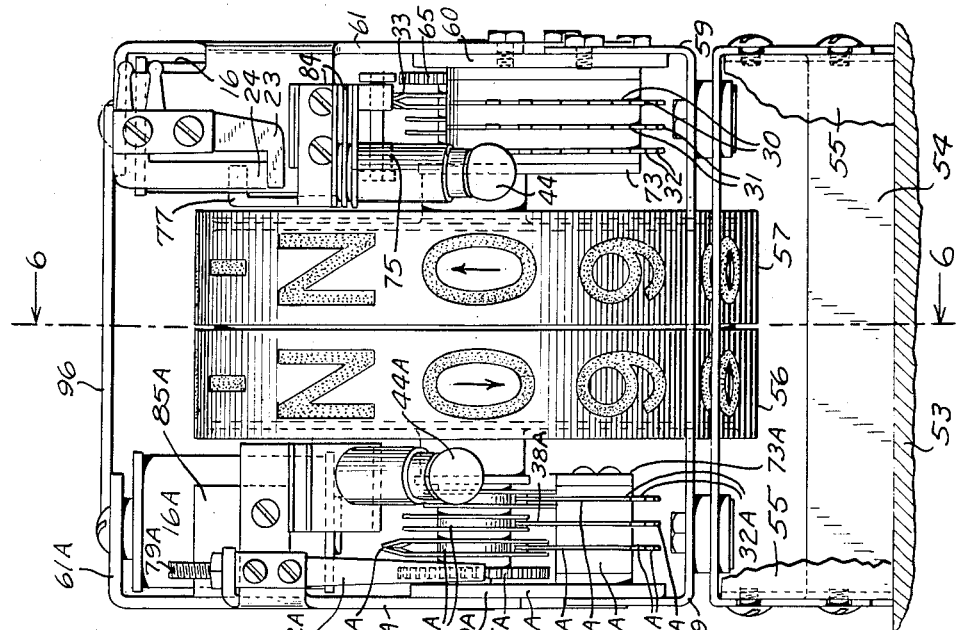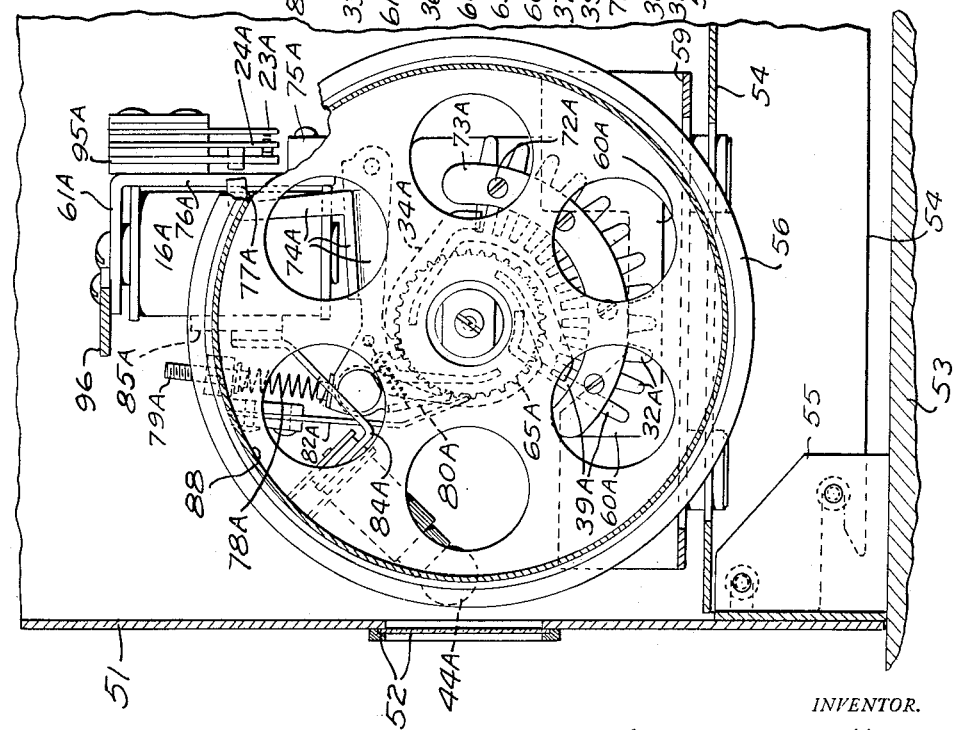

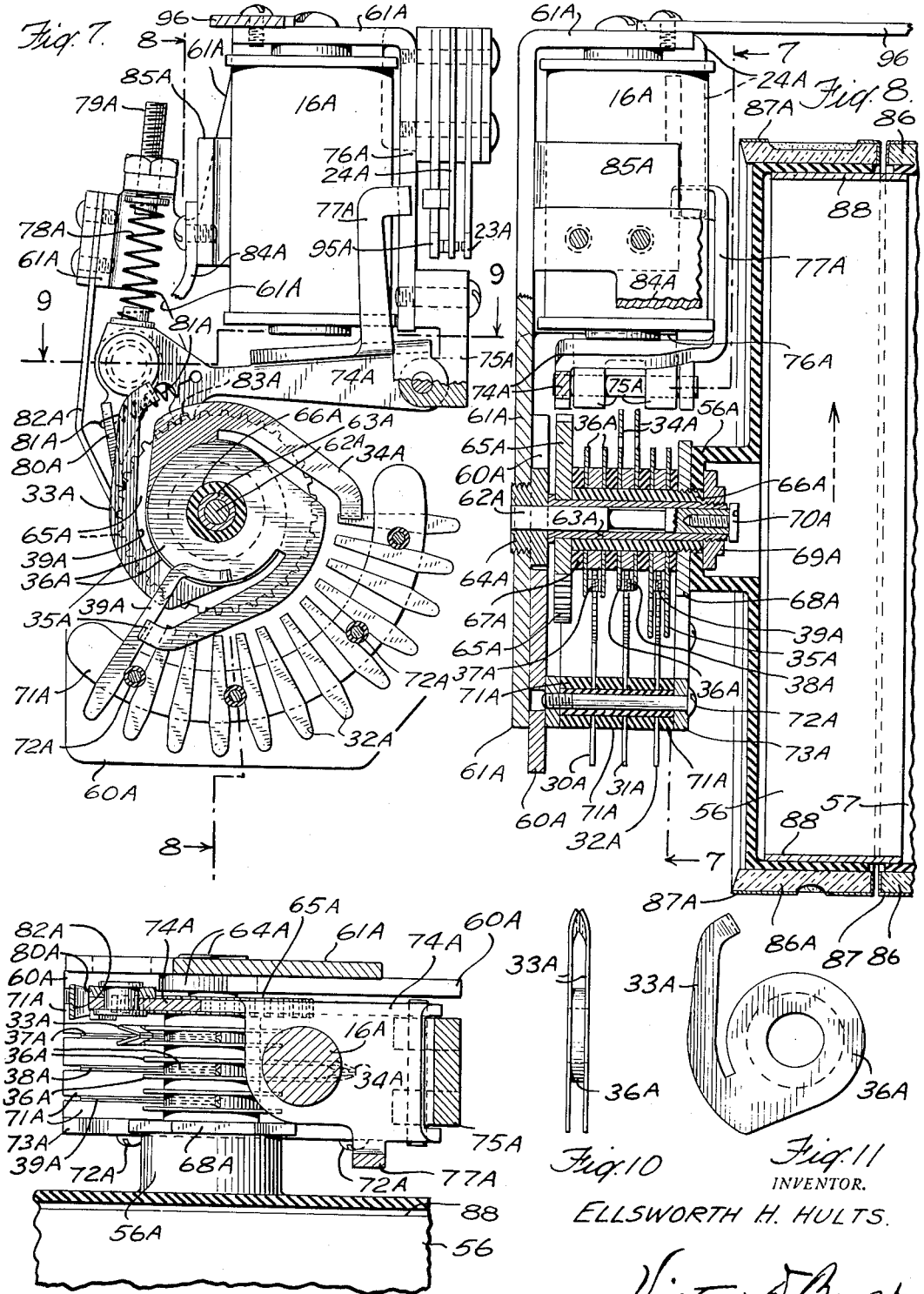

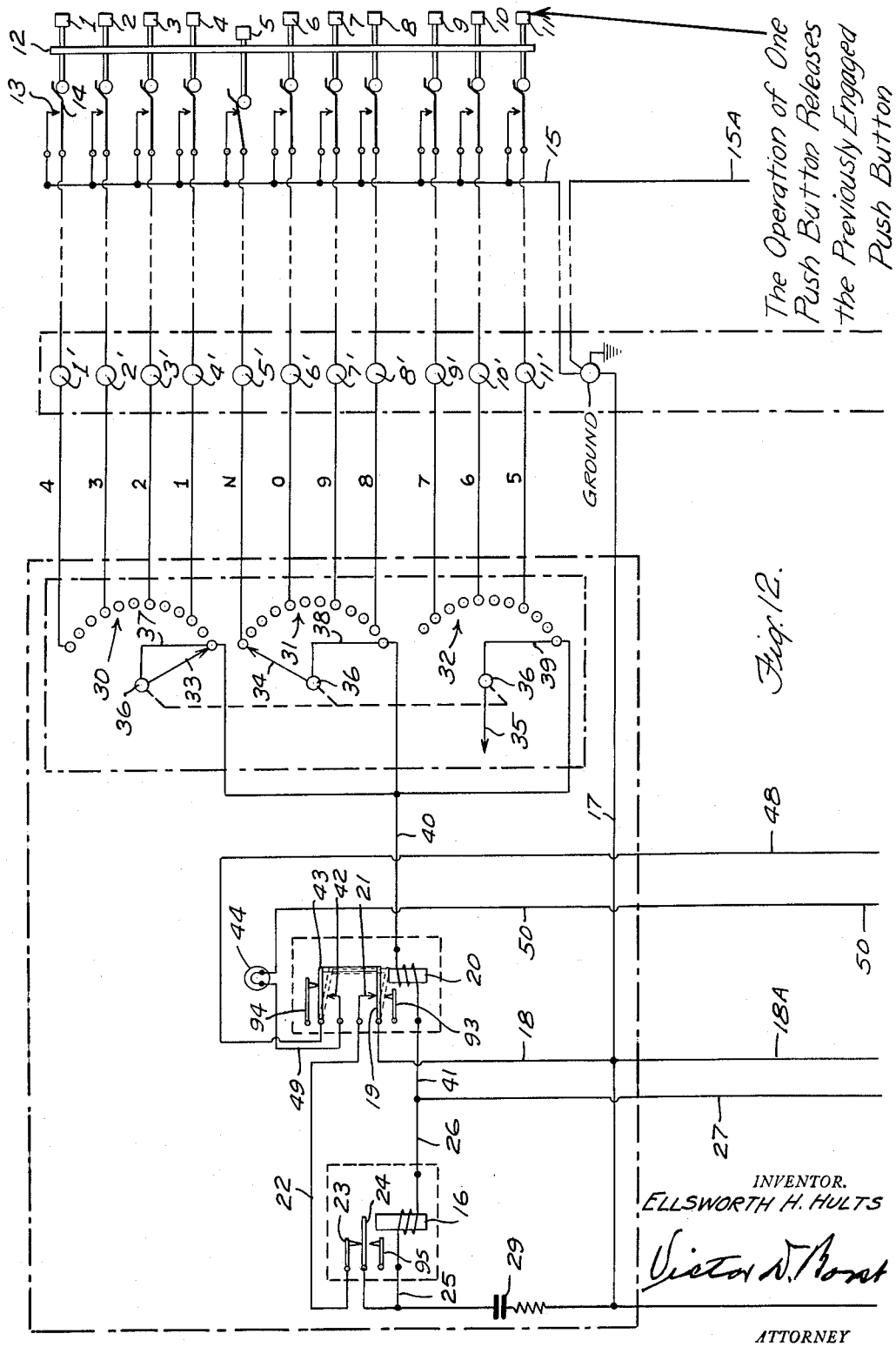

United States Patent Office 2,748,382
Patented May 29, 1956

2,748,382

SELECTIVELY RESPONSIVE INDICATOR

Ellsworth H. Hults, Baldwin, N. Y., assignor to Smith-Meeker Engineering Company, New York, N. Y., a corporation of New York Application November 22, 1952, Serial No. 321,995

2 Claims. (Cl. 340—316)

This invention relates to an indicator of the type which is selectively responsive to an extraneous condition. Embodiments are well suited, for example, for use in a master control room in a radio broadcasting station to denote the program which is being broadcast.

Assuming a considerable number of program circuits which are to be selectively connected to the broadcasting circuit, it is desirable to have prompt and accurate visual information at all times as to the circuit connected and changes in such connection. While the invention has been developed and employed especially for this purpose, the indicator of the invention is by no means limited to such use but is susceptible of a wide variety of uses.

By contrast with indicators which are commonly used for such purposes above suggested and which are set objectively according to values which are introduced into them, indicators of the invention start upon any change in extraneous circuit condition and actuate a controller which operates to limit the movement of the indicator and stop it when it has satisfied the new circuit condition. In other words the indicator is merely set going by a change in extraneous condition, whether it be a circuit connection or any other alteration of conditions which is made and which it is desired to indicate, and hunts for the tell-tale which has been created by the change in condition and to which the actuator for the indicator is responsive. In other words the change in extraneous condition establishes a local situation which has the potential of fixing a limit to the movement of the indicator and so determining its new indication.

This tell-tale or local situation may vary in its nature from a physical or magnetic force to the creation or interruption of a beam of light incident upon a photoelectric cell, or the establishment of an electric circuit.

In the presently preferred form of indicator and actuating system therefor, suitable visual indicating means are actuated by electric motive means the energizing circuit for which is interrupted by a solenoid relay which is energized when a wiper contact that is carried or driven by the indicating means engages a live contact which is connected to a source of electrical potential by the creation of the changed extraneous condition, as by pushing a switch button to connect a particular program circuit into the broadcasting circuit. The operation of this switch button releases the previously operated switch button.

In the embodiment as presently employed the indicator is of the number wheel type, the wheels being multiplied according to the number of digits desired, and the motor or motors are of the make-and-break magnet type which actuate ratchet means to propel the wheels. A breaker switch in each motor circuit is controlled by a solenoid relay which responds selectively to the closing of any one of a number of manual switches which may take the form of push buttons through the engagement of a wiper contact which is moved by the number wheel with a fixed contact that is connected to a source of potential by the closing of the particular manual switch.

The fixed contacts correspond in number to the number of manual switches and while they may theoretically be disposed around 360°, it is preferable to arrange them in a selected number of groups, three for example, side by side, and employ three wiper contacts spaced 120°. The systems for a plurality of digits will be connected in parallel to a common current source, but individually will be duplicates.

Still other advantages and features of the invention will appear from the following particular description of the illustrated embodiment of the invention.

Fig. 5 is a front elevation of the mechanism with the housing removed, on a still larger scale.

Fig. 6 is a sectional elevation on the line 6—6 of Fig. 5.

Fig. 7 is a sectional elevation on a still larger scale on the line 7—7 of Fig. 8 showing the actuating mechanism for the tens or second digit indicator wheel.

Fig. 8 is a sectional elevation of the second digit indicator wheel and its actuating mechanism taken on the line 8—8 of Fig. 7.

Fig. 9 is a sectional plan of the parts shown in Figs. 7 and 8 and taken on the plane indicated by the line 9—9 of Fig. 7.

Fig. 10 is a detail in edge view of one of the three contact or wiper arms shown in Figs. 7, 8 and 9.

Fig. 11 is a side view of the contact or wiper arm shown in Fig. 10; and

Figure 12A:
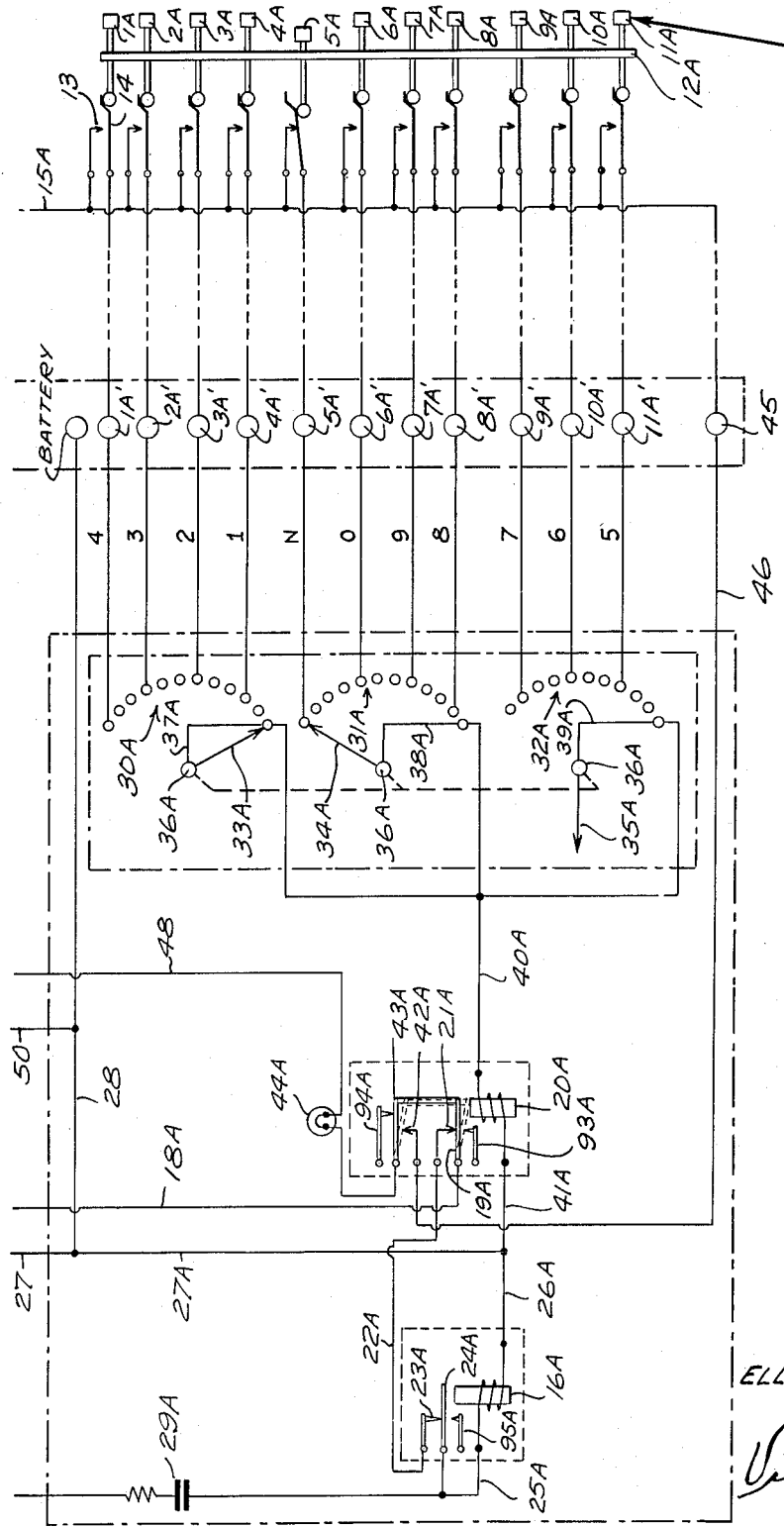

Figs. 12 and 12A together constitute a circuit diagram of the electrical system.

The embodiment shown is a two digit indicator. The principle will be understood from a description of the circuit diagram of Figs. 12 and 12A. The circuits and the mechanisms of the two digit portions of the indicator are duplicates, the electrical circuits being energized in parallel from a common source. The digit wheels and their immediate actuating means are not shown in Figs. 12 and 12A; but the electric motive device for one digit indicator appears in each figure together with the controlling circuit for that motive device. Figure 12 may be considered as showing the control circuit for the units digit indicator and Figure 12A as showing the control circuit for the tens digit indicator, it being understood that they are operated independently of each other.

Since the circuits, operating parts and other elements of Figs. 12 and 12A are duplicates, the same reference numerals will be applied to the corresponding parts in the two figures except that the letter A will be added to the numerals of Fig. 12A and so far as applicable the same distinction will be carried out in the other figures which mechanically represent the structural elements that are diagrammatically indicated in Figs. 12 and 12A.

The source of electrical energy may be a battery the two connections or contacts for which in the diagram are the contacts marked "Battery" and "Ground" in Figs. 12A and 12, respectively. There are shown eleven manual selectors in the form of push buttons for each digit circuit which, as will be seen, correspond in number to the digits on each wheel, that is, the ten digits from zero to nine, inclusive, and an eleventh digit for the "off" or "neutral" position. These push buttons are numbered from one to eleven, inclusive, and are interlocked in a well known manner by means indicated as a locking bar 12 so that the operation of one push button releases the previously engaged push button. As shown the buttons 5 and 5A are the ones last operated and these remain in circuit closing position until released by the operation of another button. As will be seen, the reading on the indicator in this circumstance is zero. In other words this is the off or inoperative condition of the indicator.

The extraneous or program circuits the connection of which to the broadcasting circuit is controlled by the push buttons are not shown, but it will be understood that in addition to closing a local indicator control circuit, as will be explained, each push button will upon operation also connect a program circuit into the broadcasting circuit.

Each push button controls a pair of local switch contacts each of which comprises a fixed contact 13 and a movable contact 14. The fixed contacts are connected in parallel by connector 15 to the ground contact for the battery, and the movable contacts are connected by leads of indefinite length and indicated by broken lines respectively to one of a series of eleven fixed contacts on the indicator mechanism. These fixed contacts are identified by a prime mark added to the numeral of its corresponding push button.

As shown, the movable contacts 14 of the push button switches are biased to open position and are controlled by a roller on the inner end of the push button stem so as to be moved to closed or contact position when the button is operated, as is shown with button 5. The operation of this button of course connects contact 5' to the ground battery contact.

The selector contacts which are cooperative with a wiper arm or arms in the relay circuits which arm or arms are moved by the indicator wheels or discs to stop the indicators on the numbers corresponding to the push buttons last operated, together with the electric motive device and its circuit will now be described.

The electric motive device is shown as a magnet motor which through a make-and-break circuit operates ratchet means to advance its respective indicator wheel. The ratchet means and indicator wheel are not shown in Figs. 12 and 12A.

The magnet motor is numbered 16 and is a solenoid the circuit for which leads from the ground contact through leads 17, 18, armature 19 of relay solenoid 20, cooperative fixed contact 21, lead 22, fixed contact 23, armature 24 of magnet solenoid 16, lead 25, winding of solenoid 16, lead 26, lead 27 and lead 28 to battery contact. Contacts 19, 21 and 23, 24 are normally closed and the respective solenoids when energized open the contacts. Since the winding of solenoid 16 is in series with the contacts 23, 24 the energizing of solenoid 16 breaks its own circuit at these contacts and the retraction of the armature restores the contact, thus causing rapid vibration of the armature in the well known way. As will later be seen this vibration is utilized to actuate the ratchet means and advance the indicator wheel. In order to prevent sparking at contacts 23, 24 a condenser 29 is connected in shunt across these contacts.

Each indicator wheel carries sensing commutator in the form of wiper contact means which cooperate with the selector contacts and which are in series with the winding of the relay solenoid 20 and so determine the point in the rotation of the indicator wheel when the relay solenoid is energized and breaks the motor magnet circuit and stops the indicator wheel. This point depends upon which push button is operated and hence which selector contact is a live contact.

The selector contacts are for convenience disposed in three arcuate groups and are so shown, the groups being numbered 30, 31 and 32, respectively, and this arrangement requires three wiper contacts or elements disposed 120° apart. The three shown are numbered 33, 34 and 35, respectively. One side of the winding of relay solenoid 20 is connected in series with the three wiper contacts in parallel. The three wiper contacts are mounted side by side and have hub portions, 36 which are insulated from each other, as will be seen, and are engaged by brushes 37, 38 and 39 respectively, which have electrical connection with one contact of their respective group of selector contacts. These three wiper contacts are electrically connected in parallel to lead 40 which is connected to one side of the winding of the relay solenoid 20. The other side of the winding is connected by lead 41 to lead 27 and thus to the battery contact.

The fixed contacts 1' to 11', inclusive, are connected to selected ones of the selector contacts. Groups 30 and 31 are shown as each having twelve contacts and group 32 as having eleven contacts. One of each of these is used for the brush connection, as above explained, and of the remaining thirty-two only eleven are used in the present arrangement, four of the fixed contacts 1' to 11', inclusive, being connected to four selector contacts in each of groups 30 and 31 and three being connected to selector contacts in group 32. These of course might be arranged in any order with relation to the numbers on the indicator wheels, but in the commercial indicators the arrangement is such that fixed contact 1' and hence the first push button when operated will stop the wheel on the number 4, the next one on 3 and so on in the order indicated in the diagram. The fifth push button which is the one shown operated will bring up the letter N which is the condition when no program circuit is connected to the broadcasting circuit.

In addition to the breaker switch which has contacts 19 and 21, the relay also controls a lighting circuit, which as will later appear includes lamps which illuminate the exposed numbers when the indicator wheels are stationary but are not lighted when the circuit of the motor magnet is intact and the indicator wheel is being actuated.

As shown, the relay controls a lamp switch comprising normally open contacts 42 and 43. Contact 42 is fixed and contact 43 is movable with the armature of the relay. A lamp 44 of the units indicator section is connected in series with lamp 44A of the tens indicator section. The circuit for these lamps is as follows: from Ground contact for the battery through lead 15A, contact 45 supported in association with the fixed contacts 1A' etc., lead 46, contact 42A, contact 43A, lead 47, lamp 44A, lead 48, contact 43, contact 42, lead 49, lamp 44, lead 50, to lead 28 and the Battery contact.

The operation is evident. When a wiper contact engages a live contact the relay circuit is closed and the motor circuit is broken, thus stopping the indicator wheel and closing the lamp circuit. It requires the closing of another manual switch to start the motor again, whereupon it will continue to run until the wiper strikes the newly connected live contact.

For instance, let it be supposed that the operator closed extraneous circuit number twenty-seven. This would be done by operating push buttons 9 and 3A. Their operation would release buttons 5 and 5A and with the motor circuit connected to battery, the units motor will operate the wiper contacts until wiper 35 engages the contact of group 32 which is connected to fixed contact 9', and the tens motor will operate the wiper contacts of that section until wiper 33A engages the contact of group 30A which is connected to fixed contact 3A'. The making of those contacts will energize the respective relays and break the respective motor circuits and stop the respective indicators, at the same time closing the lamp circuits and lighting the lamps.

The position of contacts 19 and 43 when the relay is deenergized is shown in full lines and their position when the relay is energized is shown in broken lines.

Figure 1:
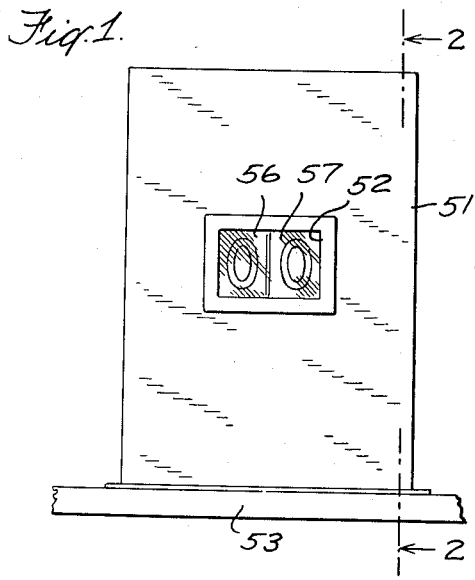
Fig. 1 is a front elevation of an indicator mechanism embodying the invention.

A front elevation of the actual indicator mechanism is shown in Fig. 1. The mechanism is contained in a casing 51 which has a window 52 through which a portion of the number wheels is exposed. In the setting of the circuits shown in Figs. 12 and 12A, as above explained and as shown in Fig. 1, the reading of the indicator is zero, both digit wheels so indicating.

Figure 2:
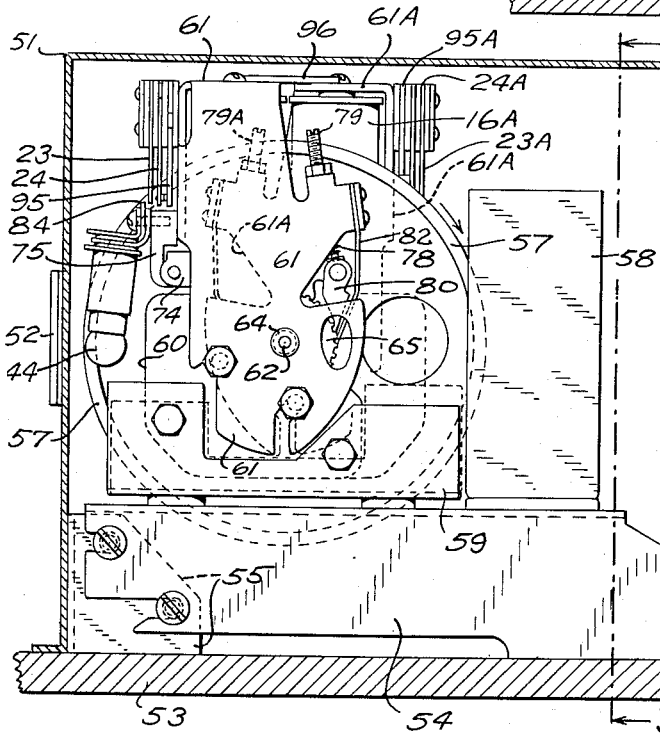
Fig. 2 is a sectional elevation on enlarged scale taken on the plane of line 2—2 of Fig. 1.

The casing 51 rests upon a base 53 to which it may be removably attached. A bottom frame member 54 for the mechanism is of inverted U-shape with a flat top and the operating mechanism is supported upon it. In the commercial device it also encloses the electrical terminals for connections to the external circuits and to the selector contacts but for clarity of illustration these are omitted from the drawings. A U-shape attaching bracket 55 is secured to the base 53 and is disposed with its legs extending rearwardly and forms attaching means for the bottom frame member 54, the latter having slotted openings for screws, as shown in Fig. 2, so as to allow for proper positioning of the indicator in the casing.

The tens number wheel 56 and the units number wheel 57 together with their actuating and control mechanism are mounted upon this bottom frame member in such manner that the wheels protrude through the top of the said member, the top being cut away to allow of this, as shown in Fig. 6. The case 58 for the condensers 29 and 29A is also secured upon this bottom frame member at the rear of the number wheels, and along side of the condenser case are supported the relays 20 and 20A.

Figure 3:
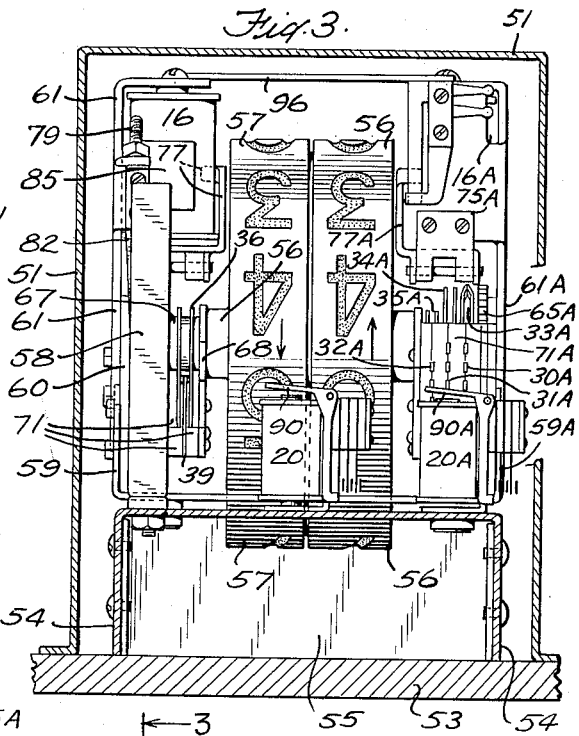
Fig. 3 is a sectional elevation on line 3—3 of Fig. 2, showing the mechanism as viewed from the rear.

The two number wheels and their associated parts are duplicates and are disposed with the wheels side by side which results in a reversal of their relative positions and hence a reversal of their directions of rotation, as indicated by the arrows in Fig. 3. As viewed from the front or through the window 52, the units number wheel 57 moves up and the tens number wheel 56 moves down.

The number wheels and their actuating controlling mechanism constitute a sub-assembly unit mounted upon the bottom frame member 54, the attachment shown being through removable screws and cushioning washers to absorb vibration.

These parts are assembled upon a U-shape cradle frame member 59, the upturned ends of which support bracket plates 60 and 60A on the respective sides. The upturned sides of the cradle member are cut away at the center as is shown in Fig. 2 and upstanding inverted L-shape brackets 61 and 61A for supporting the respective motor magnets are secured to the bracket plates 60 and 60A, respectively, flush with the upturned ends of the cradle and extending down with the cut away portions. The motor magnets 16 and 16A are suspended from the inturned ends of the brackets 61 and 61A, respectively.

The actuation of the number or indicator wheels is by means of a ratchet and pawl mechanism, as will now be described. The wheels are each mounted upon a shaft carried by the respective L-shape brackets 61 and 61A, these shafts being numbered 62 (Fig. 2) and 62A, for the units and tens wheels, respectively. For the details of the mounting construction reference is made to Figs. 7, 8 and 9 which show the tens wheel and its mounting construction, it being understood that the same explanation applies to the units wheel except that the arrangement and direction of drive are reversed.

Rotatively surrounding the shaft 62A is a metallic sleeve 63A the outer end of which is shouldered and bears against the inner face of a collar member 64A on the end of the shaft and screwed into the bracket 61A. As will be seen this shoulder spaces the rotative elements from the bracket plate 60A for freedom of rotation.

Secured on the sleeve 63A against the shoulder is a ratchet 65A and a sleeve 66A of fiber or other insulating material surrounds the sleeve 63A and extends from the ratchet to near the inner end of the metallic sleeve. The hubs 36A are disposed in spaced relation on the sleeve 66A, being insulated from each other by rings 67A of insulating material. The indicator wheel has a projecting hub portion 56A, as shown, which terminates in an annular end wall that fits upon the end of the sleeve 66A. A flat metallic annulus 68A spaces the hub from the inner insulating ring 67A and a clamping nut 69A screws on the outer end of the metallic sleeve 63A and clamps the hub 56A, the spacer 68A, the wiper hubs 36A and their insulating spacer rings and the ratchet 65A tightly together and against the shoulder on the sleeve 63A, the length of the sleeve 66A being such as to permit of this clamping. A headed screw 70A screws in the tapped end of the shaft 62A and overlaps the end of the sleeve 63A, the length of this sleeve being such that it extends slightly beyond the clamping nut 69A and the head of the screw 70A has a clearance from the clamping nut and from the sleeve 63A and provides a running freedom for the rotating parts, namely, the sleeve 63A, the sleeve 66A, the clamping nut 69A, and the parts carried by the sleeve 66A, including the indicator wheel, the spacer 68A, the wiper contacts and their insulating rings and the ratchet 65A. Therefore it is clear that the actuation of the ratchet will turn the indicator wheel and the wiper contacts.

As shown, the wiper contacts each consist of two identical metallic flat pieces which are spaced and electrically connected by a metallic annulus concentrically disposed in the hub portion and which have a more or less tangential arm which constitutes the wiper contact the ends of the two members of which are bent together so as to meet or substantially so. As will be seen these meeting ends receive the fixed contacts between them, resiliently opening up as they wipe over the fixed contacts. The brushes 37, 38, 39, etc. have split engaging ends which engage the hubs of their respective wiper contacts, being entered between the two spaced elements of the respective hubs and having the two portions of the split ends flaring apart so as resiliently to bear against the inner faces of the two hub elements.

The selector contacts 30A, 31A and 32A are elongated strips radially disposed in the three groups immediately below the shaft 62A in range of the wiper contacts rotative thereon. These three groups of contacts are each disposed in an arc and are clamped between arcuate insulation strips 71A on posts 72A projecting out from the bracket plate 60A. An arcuate metallic strip 73A on the outside completes the contact assembly. The brushes 37A, 38A and 39A are clamped in the plane with the contacts 30A, 31A and 32A, respectively, as shown particularly in Fig. 7. The outer ends of these contacts and brushes extend clear of the insulation strips and the proper contacts have the leads from the fixed contacts 1A' etc. connected to them, while the brushes have their outer ends connected to the respective branches of the lead 40A.

The armature 74A is pivoted in a bracket 75A on an extension 76A of the bracket 61A which extends down along the rear side of motor magnet 16A. A bell crank arm 77A has an angular end that functions as a pusher to engage a projection on contact 24A and push it against its bias into engagement with contact 23A. These contacts are carried by a proper insulating assembly secured on the bracket extension 76A. The electrical connections to the motor magnet and to the contacts 23A and 24A are as shown in the diagram of Fig. 12A.

The pivoted armature 74A is biased to its down or non-attracted position shown in Fig. 7 by a coiled expansion spring 78A (the corresponding spring for the units section being numbered 78 in Fig. 2). This spring is supported on a forwardly projecting arm on the bracket 61A with its lower end fitting over a round extension on the top of the free end of the armature and its upper end fitting over a similar downward extension supported by the bracket and adjustable by screw 79A to vary the tension of the spring.

The armature 74A has a pawl 80A which is pivoted on the outer end of the armature and is held by coiled spring 81A into engagement with the teeth on the ratchet 65A. A flat spring 82A which is attached at its upper end to the outer face of the spring supporting arm on bracket 61A has its lower end directed to engage in a tooth of the ratchet below that engaged by the pawl and thereby brake the ratchet and lock it against backward rotation. Centering teeth on an arm 83A on the lower side of the free end of the armature engage teeth on the ratchet and assure exact positioning of the ratchet after each actuation.

The lamps 44 and 44A are supported by brackets in positions directly at the outer sides of their respective indicator wheel rims opposite the numbers exposed through the window 52. Since the actuating mechanisms for the two wheels are relatively reversed and consequently drive the wheels in opposite directions, and since the lamps are necessarily disposed in the front at each side of the window 52, it follows that the brackets for the lamps are respectively attached to opposite sides of the magnet supporting brackets 61 and 61A, each being on the side that is toward the front. The lamp bracket 84 for the units number wheel side is shown as attached to the bracket 75 which contains the pivot for the armature 74, while the lamp bracket 84A for the tens number wheel side is shown as attached to a bracket arm 85A which is fastened to the bracket 61A and extends laterally in front of magnet 16A.

As shown in Fig. 8, the number wheels which may be of bakelite or other suitable material have each a peripheral band or rim of light transmitting plastic such as Lucite, numbered 86 and 86A, respectively, for the units and tens wheels. The numerals and other indicia on the peripheral surface are etched or depressed in the surface as indicated in the rim 86A in Fig. 8, and are preferably coated with a white coating, while the rest of the surface of the rims has a black opaque coating 87 and 87A, respectively. The light therefore from the lamps which are disposed at the outer edge of the respective Lucite bands at the sides of the window will be transmitted laterally by the Lucite and will illuminate the white depressed numbers and letters. Elsewhere because of the opaque coating the surface of the number wheels is unilluminated and black, and the white letters are clearly legible.

As shown the wheels are cup shaped with their open sides adjacent, and their bottoms or hub supporting walls are lightened by the provision of holes as shown in Fig. 6. These holes permit the light from the lamps to enter the interior of the wheels and means are therefore provided to cover the space between the adjacent edges of the wheels which would otherwise appear in the window as a luminous streak. For this purpose a lining member 88 is provided for one of the wheels of such a width that it extends across the space partially into the adjacent wheel as shown in Fig. 8.

Figure 4:
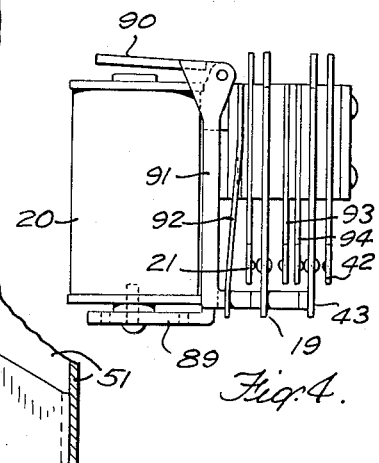
Fig. 4 is an enlarged view of one of the relay mechanisms shown in Fig. 3.

The relays 20 and 20A are duplicates and are of the detail construction shown in Fig. 4. The attaching L-shaped bracket 89 carries the contact assembly on its upright leg which leg also provides a pivot for the armature 90. This armature is a bell crank member the downwardly extending arm 91 of which terminates in a presser foot that operates the contacts.

As shown, the contacts are clamped between insulating strips, the whole assembly being secured to the bracket by through screws and having an outer metallic clamping plate. The leads 18, 22, 48 and 49 are connected to the ends of the contacts 19, 21, 42 and 43 which project above the insulation. A flat spring 92 bears against the presser foot of the armature arm 91 and retracts the armature and disposes the contacts in their biased positions. The contact members 19 and 43 carry insulating spacers which transmit the operating movement of the presser foot. The contacts 19 and 43 are shown as having back contacts 93 and 94, respectively, which have no electrical connection and merely serve to help to provide a stop for the contacts in that direction. The contacts 24 and 24A have similar back contacts 95 and 95A, respectively, as shown in Fig. 7. These back contacts have no electrical function and may be omitted.

From Fig. 4 it will be seen, therefore, that with the relay solenoid deenergized the motor magnet contacts 19 and 21 are closed and the lamp contacts 42 and 23 are open, and that these contact conditions are reversed when the relay solenoid is energized.

The two digit mechanisms may be tied together at the top as shown by a strap 96 which is fastened at its ends to the inturned ends of the respective brackets 61 and 61A; thus assuring parallelism of the number wheels.

The operation of the mechanism is thought to be apparent from the above description. When a push button is operated in the tens circuit, for example, the push button which has been closing the circuit of relay 20A is opened and magnet 16A becomes energized. The attraction of armature 74A breaks the magnet circuit at contacts 23A and 24A and spring 78A retracts the armature thereby actuating pawl 80A and ratchet 65A and hence number wheel 56. This intermittent actuation is rapidly continued, thereby rotating wiper contact arms 33A, 34A and 35A and the wiper contacts "hunt" the live contact in groups 30A, 31A and 32A. The brushes 37A, 38A and 39A keep constant engagement within the two hub members of the respective wiper contacts so that these contacts have constant electrical connection with the relay winding and when the live contact is engaged the relay is energized and the presser foot of the armature 90A swings out and breaks contacts which correspond to contacts 19, 21 and closes the lamp contacts which correspond to contacts 42, 43. The wheel 56 is thus stopped with the proper indication exposed through the window.

It is obvious that the invention is independent of many of the mechanical details, such as the particular form of electromotive device and the form or group arrangement of the contacts, and that equivalent mechanical means will readily occur to those skilled in the art within the principle and scope of the invention as defined in the following claims.

What is claimed is:

1. An indicator comprising a rotary switch having a movable wiper and a plurality of contacts, means including a motor magnet for moving said wiper into successive engagement with said contacts and including a winding, a control relay having a winding, a normally closed make and break switch arranged to be opened by the motor when the motor winding is energized and to be automatically restored into closed position when the motor winding is deenergized, a normally opened breaker switch arranged to be opened by the relay when the winding of said relay is energized and to be closed automatically when the winding of said relay is deenergized, a source of electric current, means connecting said motor winding, said make and break switch and said breaker switch in series in a loop across said source of current, means connecting said relay winding and said rotary switch in series across said source of current in another loop in parallel with said first mentioned loop, a plurality of manual selector switches, each being connected in series with said rotary switch and said relay winding and having a pair of contacts, one contact of each selector switch being connected to one side of said source of electric current and the other contact of each selector switch being connected to a corresponding contact of said rotary switch, said selector switches being of the type wherein the closing of one selector switch opens the previously closed selector switch, and indicating means driven by said motor magnet synchronously with said wiper.

2. An indicator as described in claim 1, wherein the contacts of said rotary switch are arranged in a plurality of arcuate groups and said wiper comprises a corresponding plurality of wiper elements, each being movable into successive engagement with the contacts of the corresponding group, said wiper elements being angularly spaced, whereby only one wiper element is moving over the contacts of the corresponding group at any one time.

References Cited in the file of this patent

UNITED STATES PATENTS

| | | |
|---|---|---|
| 518,037 | Hunter | Apr. 10, 1894 |
| 1,399,728 | Adams | Dec. 13, 1921 |
| 1,783,122 | Horlacher | Nov. 25, 1930 |
| 1,900,911 | Christian | Mar. 14, 1933 |
| 2,074,066 | Wheeler | Mar. 16, 1937 |
| 2,094,122 | Haselton | Sept. 28, 1937 |
| 2,096,954 | Bellamy et al. | Oct. 26, 1937 |
| 2,132,277 | Stewart | Oct. 4, 1938 |
| 2,140,126 | Broadwell | Dec. 13, 1938 |
| 2,300,954 | McMaster | Nov. 3, 1942 |
| 2,591,555 | Klopf | Apr. 1, 1952 |
| 2,600,938 | Thierfelder | June 17, 1952 |
| 2,617,870 | Kern | Nov. 11, 1952 |